Patented Aug. 6, 1940

2,210,434

UNITED STATES PATENT OFFICE 2,210,434

ARTIFICIAL MASS

Leo Rosenthal and Wilhelm Becker, Leverkusen I.G.-Werk, Germany, assignors to I. G. Farbenindustrie Aktiengesellschaft, Frankfort - on-the-Main, Germany No Drawing. Application September 29, 1937, Serial No. 166,366. In Germany October 8, 1936

1 Claim. (Cl. 260—735)

Our present invention relates to a new composition of matter.

Halogen-containing film forming materials, for instance chlorinated rubber or after-chlorinated polyvinyl chlorids are distinguished by their stability to acids and alkalies. There has hitherto, however, been a lack of cheap softeners which can be mixed homogeneously in all proportions with the said materials and which are stable to acids and alkalies. For example petroleum cannot be used as an addition to the said materials as it does not mix with them homogeneously; it even precipitates the said products.

Our present invention is based on the discovery that the aromatic and the highly carburetted unsaturated hydrocarbons of high boiling point containing in petroleum mix homogeneously with the said film forming materials in all proportions. According to this invention therefore the said petroleum ingredients are employed as additions to such film forming materials. The mixtures of the two components can be used for various purposes, for instance for the manufacture of plastic masses, lacquer coatings, films and adhesive substances. The said ingredients of petroleum are a very cheap addition to the film forming materials of the character described. They mix for instance with chlorinated rubber or after-chlorinated polyvinyl chloride in all proportions and even dissolve these film forming materials without any addition of further solvents. They have a surprisingly good softening action upon the said film forming materials and if used in large quantities, give the mass a high elasticity, the product showing no undesired tackiness. Of course, the said additions, for instance with other softeners, resins, drying or non-drying oils, dyestuffs and pigments.

The said ingredients of petroleum, namely, aromatic and highly carburetted unsaturated hydrocarbons of high boiling point can be obtained by various means, for instance by treating the petroleum with liquid sulphur dioxide in accordance with Edeleanu process. According to the intended application either the whole extract or individual fractions thereof are used.

The following examples illustrate the invention the parts being by weight:

Example 1

100 parts of chlorinated rubber (containing 64% of chlorins) are kneaded at about 100° C. with about 120 parts of a petroleum-extract obtained according to the Edeleanu process (of boiling limits between 170° and 230° C., under 12 mm. pressure) until a uniform viscous mass has been formed. This mass can be used, for example, as a waterproof, acid- and alkali-resisting cement or adhesive substance either by working at elevated temperatures or at ordinary temperatures with the addition of small quantities of solvents.

Example 2

A mixture consisting of:
 25 parts of chlorinated rubber (containing 62.5% of chlorine),
 20 parts of a petroleum extract according to Example 1 (boiling limits 200–300° C. under 12 mm. pressure),
 75 parts of xylene is ground with
 30–35 parts of titanium dioxide and some lampblack.

A paint is obtained which yields protective coatings of excellent stability to water, acids and alkalies.

Example 3

A mixture consisting of:
 15 parts of chlorinated rubber (containing 65% of chlorine)
 15 parts of a petroleum extract obtained according to the Edeleanu process (boiling limits 160–310° C. under 12 mm. pressure)
 7–8 parts of a resin obtained according to specification No. 306501
 42.5 parts of toluene
 20 parts of xylene which may be mixed with pigments or soluble dyestuffs, is excellently suited as a spraying varnish for all kinds of metals.

Example 4

15 parts of after-chlorinated polyvinyl chloride (containing 64% of chlorine) are dissolved in
 175 parts of a mixture consisting of 2 parts of ethyl acetate 2 parts of benzene and 1 part of acetone
 10–12 parts of a petroleum extract obtained according to the Edeleanu process (boiling limits 180–290° C. under 10 mm. pressure).

This solution may be used with advantage as impregnating agent for textiles.

Example 5

A mixture of:
 12 parts of a high-viscosity soluble chlorinated rubber 10-12 parts of a petroleum extract obtained according to the Edeleanu process (boiling limits 240-310° C. under 10 mm. pressure) and 3 parts of chlorinated diphenyl (containing 55% of chlorine) with 15 parts of a resin obtained from coal-tar naphtha (boiling point 160-180° C.) by the action of aluminium chloride in the presence of water is kneaded in the hot whereby a thermoplastic mass of excellent resistance capacity is obtained. Mixed with asbestos and the like the mass can be used as building material for chemical plant (as for instance pipes for corrosive gases and liquids), so long as high working temperatures are avoided.

*Example 6*

A film consisting of:

100 parts of after-chlorinated polyvinyl chloride and 40-60 parts of a petroleum extract according to Example 2 can suitably be used for water-tight, acid- and alkali-resisting wrappings and the like.

We claim:

The composition of matter comprising a halogen-containing, film-forming hydrocarbon selected from the group consisting of chlorinated rubber and polyvinylchloride, and as a softener the aromatic and highly carburetted unsaturated hydrocarbons of high boiling point obtained from petroleum by the Edeleanu process, the quantity of halogen-containing hydrocarbon and softener being in proportions of from about 1:1 to about 3:1.

LEO ROSENTHAL.
WILHELM BECKER.